United States Patent [19]

Miyashita et al.

[11] Patent Number: 4,943,403

[45] Date of Patent: Jul. 24, 1990

[54] METHOD FOR MOLDING A PULVERULENT MATERIAL

[75] Inventors: Tsuneo Miyashita; Hiroaki Nishio; Michitaka Sato, all of Yokohama, Japan

[73] Assignee: Nippon Kokan Kabushiki Kaisha, Tokyo, Japan

[21] Appl. No.: 872,398

[22] Filed: Jun. 10, 1986

[30] Foreign Application Priority Data

Jun. 17, 1985 [JP] Japan .................. 60-129960

[51] Int. Cl.$^5$ .................. B22F 1/00; B28B 11/22
[52] U.S. Cl. .................. 264/233; 264/63; 264/344; 419/36
[58] Field of Search .................. 264/63, 344, 233; 419/36, 37, 65

[56] References Cited

U.S. PATENT DOCUMENTS

| | | | |
|---|---|---|---|
| 2,939,199 | 6/1960 | Strivens | 264/63 |
| 3,953,562 | 4/1976 | Hait et al. | 264/63 |
| 3,966,981 | 6/1976 | Schultz | 426/425 |
| 4,012,194 | 3/1977 | Maffei | 8/142 |
| 4,069,060 | 1/1978 | Hayashi et al. | 264/82 |
| 4,197,118 | 4/1980 | Wiech, Jr. | 264/63 |
| 4,248,814 | 2/1981 | Yajima et al. | 264/63 |
| 4,404,166 | 9/1983 | Wiech, Jr. | 264/63 |
| 4,518,398 | 5/1985 | Tanaka et al. | 264/65 |
| 4,597,790 | 7/1986 | Matsui et al. | 419/37 |
| 4,731,208 | 3/1988 | Nakajima et al. | |
| 4,820,462 | 4/1989 | Nakajima et al. | 264/344 |

FOREIGN PATENT DOCUMENTS

| | | | |
|---|---|---|---|
| 615429 | 2/1961 | Canada | 264/63 |
| 43395 | 1/1985 | European Pat. Off. | |
| 8203566 | 10/1982 | World Int. Prop. O. | |

*Primary Examiner*—James Derrington
*Attorney, Agent, or Firm*—Fleit, Jacobson, Cohn, Price, Holman & Stern

[57] ABSTRACT

There is disclosed a method for eliminating an organic dispersion medium from a molded product obtained by plasticizing-molding or casting-molding of metallic and/or ceramic powders wherein the elimination is by extraction by liquid carbon dioxide at a temperature not lower than $-30°$ C. and not higher than $-31.1°$ C. The method prevents nonuniform volumetric decrease of the molded product to be otherwise caused by the extraction of the organic dispersion medium, while also making it possible to completely eliminate the organic dispersion medium without causing residual strain or deformation in the molded product.

1 Claim, No Drawings

METHOD FOR MOLDING A PULVERULENT MATERIAL

FIELD OF THE INVENTION

This invention relates to mixing an organic dispersion medium to metallic or ceramic powders, plasticizing-molding or casting-molding the resulting mixture and eliminating the dispersion medium without causing inconveniences to the resulting molded product.

BACKGROUND OF THE INVENTION

Description of the Prior Art

Heretofore, for the preparation of molded proucts of complicated profile, it is known to use, for example, an injection molding method by using as starting material metallic powders such as powders of 2% Ni –98% Fe, powders of SUS 316 or stellite powders, ceramic powders such as alumina, silicium carbide, silicium nitride or zirconia powders or metal-ceramic powder mixtures such as a mixture of ceramics and tungstene carbide or cobalt.

For example, the injection molding method is used by Parmatech Corp. for the preparation of small-sized machine components formed of 2% Ni –98% Fe or stainless steel; by the Carborundum Company for the preparation of turbine components of silicium carbide; and by Messrs. ASEA for the preparation of gas turbine wheels of silicium nitride.

In general, injection molding is composed of the following steps:
  (i) the step of mixing powders of starting materials with an organic dispersive medium or binder to give a thermoplastic mixture;
  (ii) the step of softening the mixture in a heated cylinder and injecting the thus-softened mixture into a metallic mold;
  (iii) the step of opening the metallic mold to take out the molded product;
  (iv) the step of degreasing for eliminating the organic dispersive medium from the molded product; and
  (v) the step of calcination for elevating the density of the molded product.

The success of injection molding consisting of these respective steps depends notably on the kind of the organic binder employed in the process. Above all, the yield of the ultimate products is occasionally influenced by whether or not the appropriate organic binder is employed.

The purpose of using the organic dispersive medium or binder is to impart plasticity and moldability of the starting pulverulent material. In case of poor moldability, flaws such as silver marks, weld lines or sink marks are produced in the molded products.

While moldability can be improved by increasing the addition amount of the organic dispersive medium, a large amount of the binder is naturally removed in the degreasing step with the result that flaws such as crevices, deformation or foaming are likely to be induced in the molded products.

In practicing the above described molding process, it has been tried to reduce the amount of the organic dispersive medium to a smallest value possible while using such organic binder as will not cause the aforementioned defects during the degreasing step. In general, a mixture of low molecular weight polyethylene, polystyrene, paraffin or fine crystal wax and a minor amount of oil or thermoplastic resin is used as such binder.

In addition, polypropyrene, polyvinyl alcohol, polyvinyl butyral, polyethylene glycol, methyl cellulose, atactic polyester cellulose, hydroxy ethyl cellulose or acrylic resin can also be used as the binder. It has also been customary to add a small amount of stearates into the organic dispersive medium for improving mold release properties of the molded products.

In the meanwhile, the following difficulties are presented with these conventional binders.

(i) In the above method, the organic dispersive medium is cracked and vaporized off in the degreasing step by heating to a temperature of ca. 400° to 500° C. At this time, it is necessary that the molded product be gradually heated to a maximum temperature so that the gas will be evolved with cracking of the binder at a rate not higher than the rate of gas diffusion by way of pores in the molded product. When the rate of gas evolution is higher than that of gas diffusion, the pressure in the molded product is increased thus occasionally causing deformation, cracking or foaming. Therefore, a prolonged processing time of 70 to 100 hours is usually required in the degreasing step so that the merit of higher productive efficiency proper to the techniques of injection molding is ultimately lost.

(ii) While the heating over an extended period of time is required in the degreasing step, the evolved heat is as low as 400° to 500° C. as noted above and hence economically difficult to recuperate as effective heat energy. Thus it is discarded as waste heat.

(iii) Although degreasing is terminated with completion of heat cracking of the binder, it is not possible to remove the grease completely so that small amounts of carbon or oil and fat are left in the binder. These residual amounts of carbon or oil and fat are likely to detract from the properties of the calcined product.

(iv) Since the products recovered from the degreasing process are decomposition products of the organic dispersive medium and cannot be reused, they are usually discarded, with the result that production costs are correspondingly elevated.

The aforementioned problems yet to be solved are presented not only in the techniques of injection molding but in the techniques of molding of plastic materials in general, such as those of extrusion molding or die casting.

There is also known a casting-molding method for molding of metallic powders, ceramic powders, or a mixture of metallic and ceramic powders. According to this method, a viscous slime of starting powders is cast into a liquid-absorbing mold to form a wall layer to produce the molded product.

For producing the viscous slime of starting powders, the starting powders are mixed with a minor amount of the dispersive medium such as water and crushed together in a ball mill. The resulting slime can be stirred for several days, adjusted for viscosity or moisture and defoamed in vacuo for improving its stability.

A plaster mold is assembled after the mold release agent is applied on the surfaces of the various mold components. The slime prepared in the above described manner is cast into the mold. With the absorption of moisture into the mold, a wall layer is formed on the mold surface and grown with the lapse of time.

For molding a hollow article, excess slime can be discharged when the wall thickness reaches a predetermined value.

Since the mold into which the slime has been cast as described above continues to absorb the moisture, water contents in the wall layer are decreased gradually so that the cast article is increased in hardness and contracted so as to be detached from the mold.

At this time, the cast article is removed and subjected to rough and finish processing steps, followed by drying. The plaster mold from which the cast article has been removed can be dried for repeated usage for molding.

A variety of alcohols can be used besides water as the dispersive medium used for the preparation of the starting slime of the powder mixture.

As a mold material, water permeative mold materials selected from the group of plastic materials superior in mechanical strength or wear resistancy and the metal-ceramic fiber composite materials can be used in place of plaster.

There is also known a method according to which a core is inserted and the powdered material is tamped, after which the core is removed to produce the mold of compacted powders to be used for molding. The mold is destroyed after termination of molding while the compacted powders are recycled into the batch of the powdered material. In this case, the powdered material can be advantageously reused.

The major problem in the casting-molding of the metallic and ceramic powders is presented in the drying process. There are two main steps in the drying process. In the first constant-rate drying step, the water is lost from the surface of the cast article, which then undergoes shrinkage in an amount corresponding to the volume of the lost water.

In the next reduced-rate drying step, the water is vaporized within the casting-molded product. The shrinkage which the molded product undergoes during this step is nil or at most negligible.

With the cast article with variable thicknesses, it takes some additional time until the portion of the cast article with a larger thickness shifts from the constant rate drying to the reduced rate drying, so that shrinkage does not proceed smoothly. In the case of a molded article with a larger thickness, it takes some additional time until the inner part of the article is dried, with the shrinkage on the superficial portions taking place more promptly than that at said inner portion. In this case, the molded article is likely to undergo strain or crevice formation in the course of the drying process.

In order to prevent strain or cracks from occurring, it is necessary that the inner part of the molded product in its entirety be cooled uniformly by using a lower drying temperature. To this effect, natural drying is possibly most preferred. However, natural drying is influenced by climatic conditions and need be carried out over an extended time while also requiring a large floor space and a lot of man-power.

The drying with the aid of hot air is also inconvenient in that the air volume and velocity, temperature and humidity need be maintained at uniform values, while it is also difficult to achieve a proper control because one has to take too many setting elements into account.

There is also known a high frequency drying method, according to which drying proceeds relatively uniformly. It is however difficult to dry the molded product without producing heat stresses in the respective portions as well as the inner and outer layers of the molded product. Thus, sporadic drying, crevices, cracks or strain is caused to a more or less degree with the result that the yield of the dried product is necessarily lowered.

SUMMARY OF THE INVENTION

It is an object of the present invention to eliminate the aforementioned inconveniences of the prior art method. Thus the present invention resides in a process for molding a pulverulent material characterized in that, from a molded product obtained by plasticizing-molding or casting-molding of metallic or ceramic powders, an organic dispersion medium used for molding is removed by extraction with an atmosphere of liquid carbon dioxide at a temperature of not lower than $-30°$ C. and not higher than $31.1°$ C.

DETAILED DESCRIPTION OF THE INVENTION

By the term "organic binder" or "organic dispersion medium" herein is meant such binder or medium all or an essential portion of which is constituted by organic materials including acetone and lower alcohols such as methyl alcohol, ethyl alcohol, n-propyl alcohol, i-propyl alcohol, n-butyl alcohol, i-butyl alcohol, sec-butyl alcohol or t-butyl alcohol.

The critical temperature of carbon dioxide is $31.1°$ C. whereas its critical pressure is 75.2 $kg/cm^2$ abs. The carbon dioxide in the fluid state having a temperature not lower than this critical temperature and a pressure not lower than the critical pressure is generally called supercritical carbon dioxide.

Carbon dioxide in this state is low in viscosity and high in diffusion speed while showing nil surface tension.

The basic recognition of the present invention resides in the fact that liquid carbon dioxide directly below the critical temperature is a good solvent for alcohols and ketones.

For example, 100 weight parts of supercritical carbon dioxide at 100 $kg/cm^2$ and $35°$ C. can dissolve only 3.5 weight parts of t-butyl alcohol, whereas the same weight parts of supercritical carbon dioxide at 100 $kg/cm^2$ and $25°$ C. can dissolve 12.3 weight parts of t-butyl alcohol.

It is noted that, when the temperature is too low, the diffusion speed of liquid carbon dioxide is lowered so that, conversely, the extraction speed with liquid carbon dioxide is lowered.

Therefore it is required that the temperature be lower than the critical temperature ($31.1°$ C.) and at least higher than $-30°$ C.

When liquid carbon dioxide in this state is used for extracting an organic dispersion medium in the molded product, it suffices that the molded product obtained by using alcohol or ketone as dispersion medium for molding be allowed to stand in a liquid carbon dioxide atmosphere. Liquid carbon dioxide is then permeated with lapse of time into the interior of the molded product as it dissolves the dispersion medium disposed in the interstices between adjacent particles of the molded product. The dispersion medium can be taken out by dispersion so that liquid carbon dioxide is sequentially permeated in substitution for the dispersion medium.

After the end of substitution of the dispersion medium, the pressure of the atmosphere is gradually lowered until the state of co-existence of the gas and the liquid is reached so as to permit liquid carbon dioxide to be vaporized. The pressure of the atmosphere is further lowered gradually up to the atmospheric pressure for removing carbon dioxide contained in the molded product.

Since carbon dioxide is vaporized even at an elevated pressure, volumetric increase with the progress of vaporization is rather low so that there is no risks of flaws such as crevices or cracks in the molded product.

The time required for eliminating the organic dispersion medium consisting of substitution of the organic dispersion medium by liquid carbon dioxide and the vaporizing off of carbon dioxide is of the order of 1 to 10 hours depending on the size and shape of the molded product.

The following advantages are derived upon practicing the molding method for the powdered material of the present invention.

(i) Complete elimination of the dispersion medium can be achieved with practically no damage to the molded product.

(ii) The operation of eliminating the dispersion medium can be completed in a short time which is approximately 1/30 that required with the conventional method.

(iii) Saving in heat energy is achieved since the higher temperature is not used in the step of elimination of the dispersion medium.

The present invention will be explained further by referring to several practical Examples.

EXAMPLE 1

Alumina powders 0.7 μm in mean particle size were charged into a beaker 75 mm in inside diameter and 100 mm in height. Then a test tube 12 mm in outside diameter was inserted at the center of the beaker. After the alumina powders about the test tube were tamped, the latter was drawn off to produce a mold 12 mm in diameter and 20mm in depth.

On the other hand, 60 weight parts of alumina powders, 39 weight parts of the organic dispersion medium and 1 weight part of polyethylene glycol (hereafter referred to as PEG) were mixed together for 24 hours to produce a slurry which was then poured into the mold and allowed to stand for 8 hours to permit the organic dispersion medium to be absorbed into the mold in order to complete wall formation.

The mold was then destroyed to take out a cylindrical molded product which was cut at an upper portion to give a cylindrical molded body 12 mm in diameter and 15 mm in height.

The above described sequence of operations was carried out with the use of each of eight organic solvents, that is, methyl alcohol (MeOH), ethyl alcohol (EtOH), n-propyl alcohol (n-PrOH), i-propyl alcohol (i-PrOH), n-butyl alcohol (n-BuOH), i-butyl alcohol (i-BuOH), sec-butyl (sec-BuOH) and acetone ($Me_2CO$).

Each of the cylindrical molded products obtained in this manner was held in an extraction tank adjusted to 25° C. Liquid carbon dioxide which was pre-heated to 25° C. was introduced into the extraction tank for adjusting the pressure in the tank to 100 kg/$cm^2$. This state was maintained for 2 hours to effect extraction while continuously supplying liquid carbon dioxide. After termination of supplying of liquid carbon dioxide, the pressure in the tank was returned over one hour to an atmospheric pressure.

The aim of gradually decreasing the pressure in the tank in this manner is to prevent the molded product from being destroyed due to rapid expansion of the carbon dioxide gas in the molded product.

After the termination of elimination of the dispersion medium as described above, no changes such as cracks, crevices or deformation were observed in any of the eight molded products. It was also found from the weight difference before and after the elimination of the dispersion medium that the weight reduction was caused in an amount about equal to the amount of the organic solvents employed in the elimination process.

EXAMPLE 2

A mixture containing 71 weight percent of starting powders consisting of 92 weight parts of silicium nitride powders with a mean particle size of 0.75 μm, 6 weight parts of yttria and 2 weight parts of alumina, 27 weight percent of t-BuOH and 1 weight percent of PEG were kneaded together in a pressurized kneader maintained at 30° C. The mixture was simultaneously degassed and compacted together. The resulting plasticized product was taken out after 12 hours. The kneaded product was molded into a substantially parallelepipedic shape and placed in a metallic mold set to a temperature of 20° C. Thus the product was immediately compression molded and maintained in this state for 3 minutes. The molded product was then released from the mold. The product could be released easily from the mold because of solidification of t-BuOH used as the organic solvent.

Two molded products with a size of 43.8 mm ×14.8 mm ×19.1 mm and 43.8 mm ×7.4 mm ×19.1 mm were prepared by the above described molding operation.

These molded products were placed in an extraction tank into which liquid carbon dioxide was supplied for heating to 25° C. The products were placed for two hours at 100 kg/$cm^2$ in order to carry out t-BuOH extraction.

The pressure was then lowered in the same manner as in Example 1 to produce molded products freed of the dispersion medium. No unusualties were observed in these products.

It was also found that the weight difference of the molded products before and after the elimination of the dispersion mediam was about equal to the amount of the t-BuOH employed in the molded product.

EXAMPLE 3

In the ultimate state of the kneading operation in Example 2, kneading was carried out for 30 minutes, while the kneader was cooled by circulation of cold water of 20° C., in order to give a kneaded product as a result of solidification of t-BuOH.

Two different kinds of the molded product of the same form as that in Example 2 were obtained by molding these pellets by using a screw-in-line type injection molding machine, the metallic mold of which was set to a temperature of 20° C.

The thus-obtained molded products were placed in an extraction tank and subjected to extraction-pressure reduction by using the sequence of operations similar to that described in connection with Example 1. No unusualties such as crevices or cracks were observed to exist in the molded product.

It was also found that the weight difference of the molded products before and after the operation of elimination of the dispersion medium was approximately equal to the amount of the dispersion medium used in the process.

EXAMPLE 4

From a mixture of starting materials consisting of 85 weight parts of SUS 316 powders with the particle size of 5 to 20 μm, 14 weight parts of t-BuOH and 1 weight part of PEG, pellets were produced by the method similar to that described in connection with Example 3. These pellets were prepared into two different kinds of molded products of the same form by using the injection molding conditions as those used in Example 3. These molded products were then subjected to the operation of elimination of the dispersion medium under the same operating conditions as those used in Example 2.

No usualities were observed in the molded products obtained after the elimination of the dispersion medium. The weight decrease caused by the operation of elimination of the dispersion medium was substantially equal to the amount of the molded product employed.

EXAMPLE 5

A mixture of starting materials consisting of 90 weight parts of tungstene carbide with mean particle size of 1.5 μm and 10 weight parts of cobalt with the mean particle size of 1.3 μm was charged into a wet type ball mill (a stainless steel pot with WC-Co alloy balls). Into the ball mill was also charged acetone, and the resulting mixture was subjected further to mixing and crushing for 48 hours, followed by drying.

A mixture consisting of 91 weight percent of the thus-obtained starting powders, 8 weight percent of t-BuOH and 1 weight percent of PEG were processed into pellets from which two different kinds of the molded products were obtained in the same manner as in Example 1.

These molded products were then subjected to the operation of elimination of the dispersion medium. It was found that no unusualities were observed in the products processed in this manner and the weight decrease caused by the operation of elimination of the dispersion medium was substantially equal to the quantity of the molded product employed.

What is claimed is:

1. A process for molding a pulverulent material characterized in that, from a molded product obtained by plasticizing-molding or casting-molding of metallic or ceramic powders, an organic dispersion medium used for molding selected from the group consisting of acetone, methyl alcohol, ethyl alcohol, n-propyl alcohol, i-propyl alcohol, n-butyl alcohol, i-butyl alcohol, sec-butyl alcohol and t-butyl alcohol is removed by extraction with liquid carbon dioxide at a temperature of lower than 31.1° C. and not lower than −30° C. and at a pressure now lower than 75.2 kg/cm$^2$ absolute.

* * * * *